No. 737,661. PATENTED SEPT. 1, 1903.
F. J. RAVLIN.
JUNCTION BOX, CONDUIT, AND ELECTRIC WIRING MECHANISM.
APPLICATION FILED APR. 7, 1903.
NO MODEL. 3 SHEETS—SHEET 1.
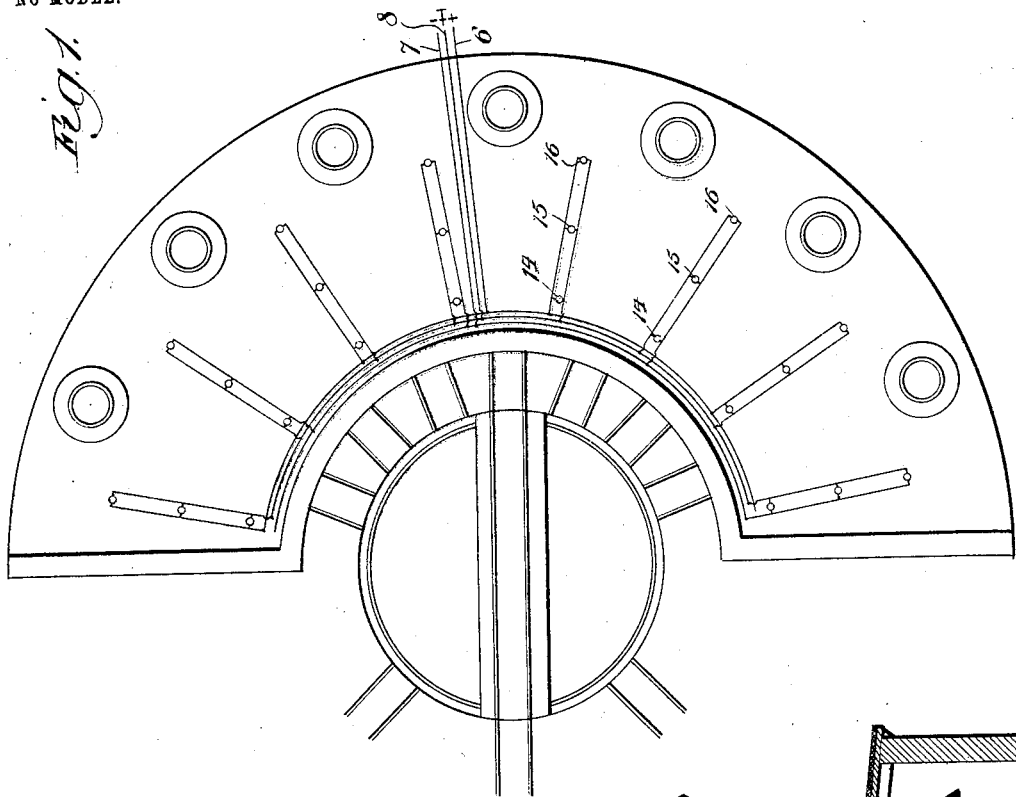
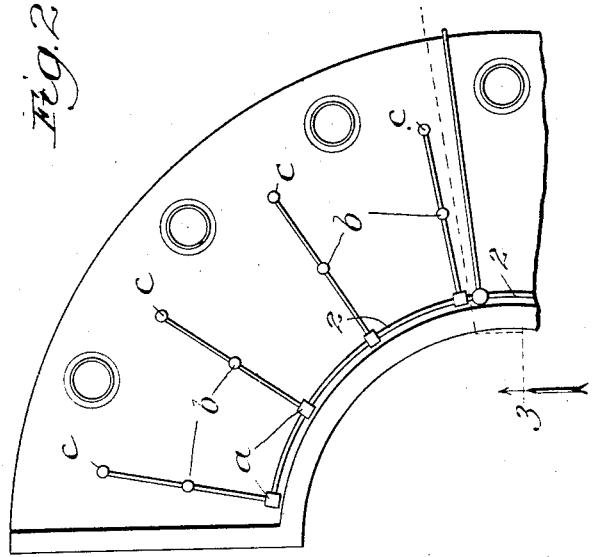
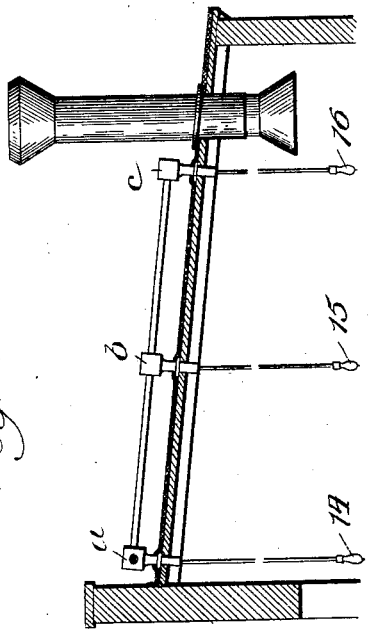
Witnesses:
Inventor:
Frederick J. Ravlin,
By Thomas F. Sheridan,
Atty.

No. 737,661. PATENTED SEPT. 1, 1903.
F. J. RAVLIN.
JUNCTION BOX, CONDUIT, AND ELECTRIC WIRING MECHANISM.
APPLICATION FILED APR. 7, 1903.
NO MODEL. 3 SHEETS—SHEET 2.
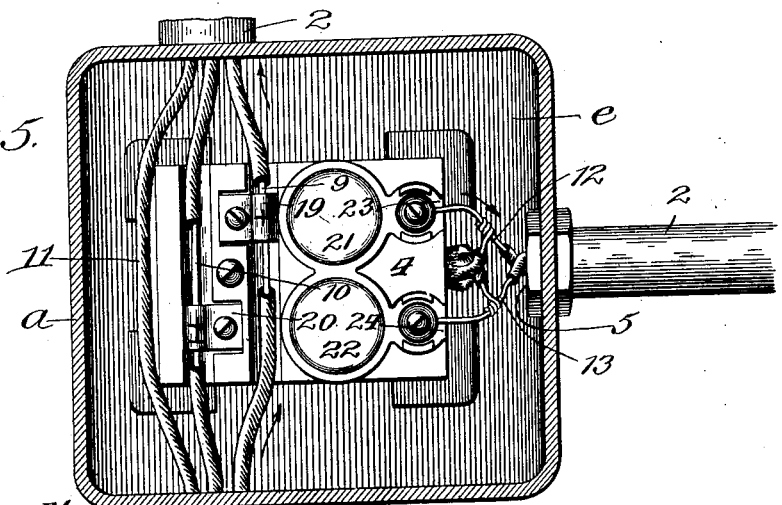
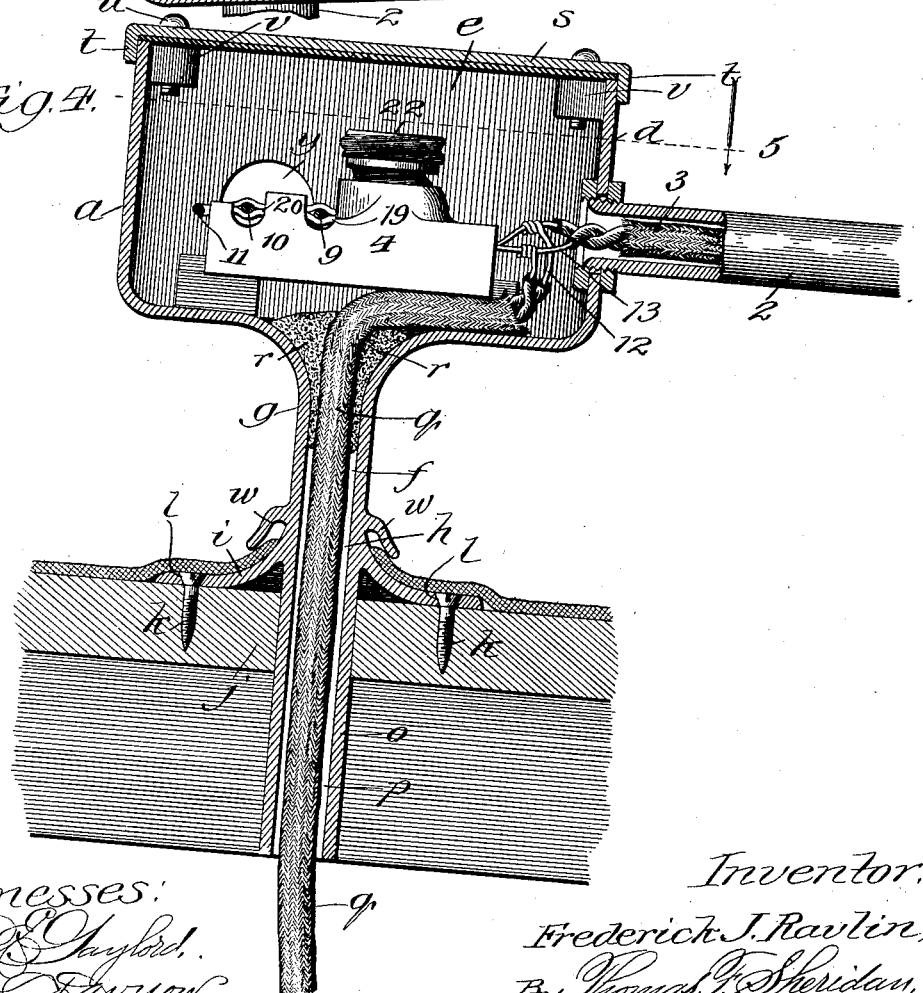
Witnesses:
Inventor:
Frederick J. Ravlin,
By Thomas F. Sheridan,
Att'y No. 737,661. PATENTED SEPT. 1, 1903.
F. J. RAVLIN.
JUNCTION BOX, CONDUIT, AND ELECTRIC WIRING MECHANISM.
APPLICATION FILED APR. 7, 1903.
NO MODEL. 3 SHEETS—SHEET 3.
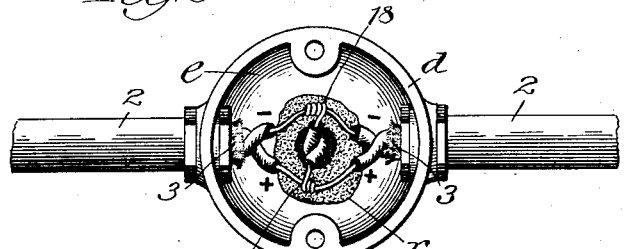
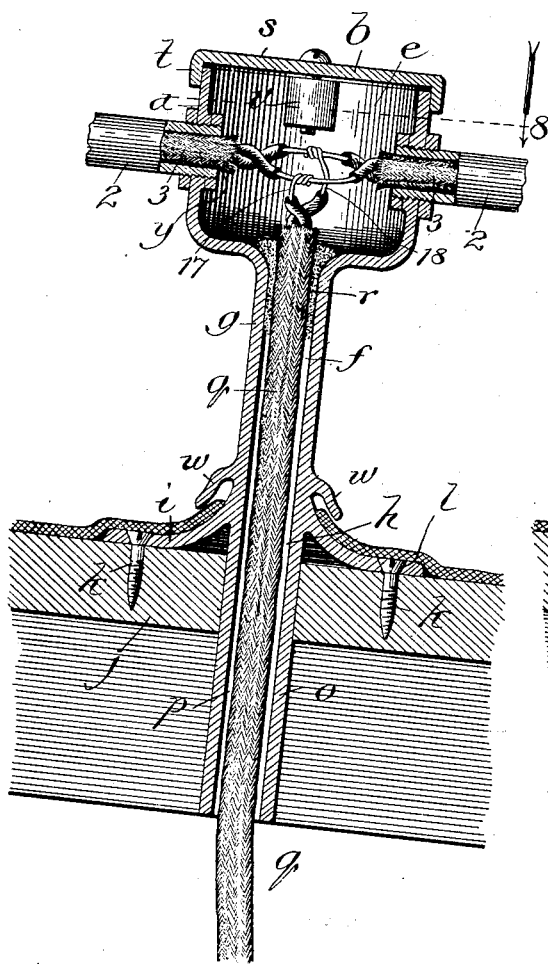
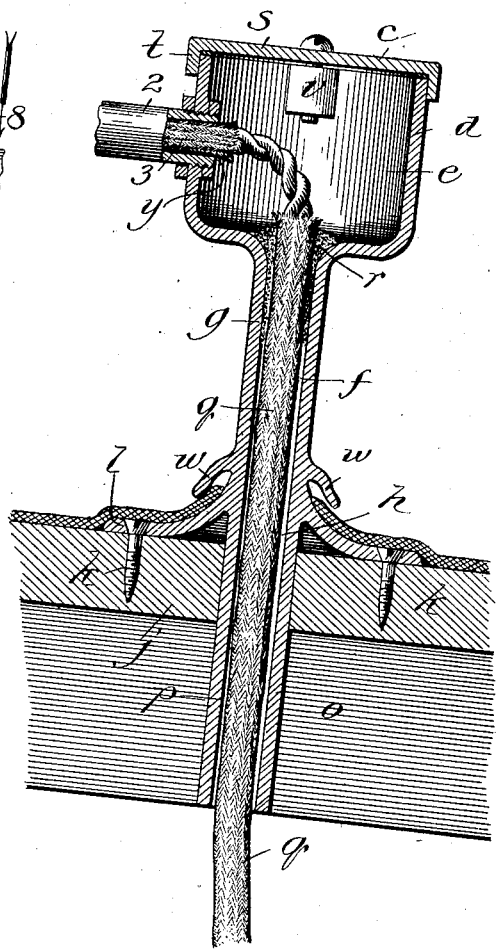
Witnesses:
Inventor.
Frederick J. Ravlin,
By Thomas F. Sheridan,
Atty.

No. 737,661.

Patented September 1, 1903.

UNITED STATES PATENT OFFICE.

FREDERICK J. RAVLIN, OF CHICAGO, ILLINOIS.

JUNCTION-BOX, CONDUIT, AND ELECTRIC-WIRING MECHANISM.

SPECIFICATION forming part of Letters Patent No. 737,661, dated September 1, 1903.

Application filed April 7, 1903. Serial No. 151,461. (No model.)

*To all whom it may concern:*

Be it known that I, FREDERICK J. RAVLIN, a citizen of the United States, residing at Chicago, in the county of Cook and State of Illinois, am the inventor of certain new and useful Improvements in Junction-Box, Conduit, and Electric-Wiring Mechanisms, of which the following is a specification.

My invention relates to that class of junction-box, conduit, and electric-wiring mechanisms used in connection with roundhouses and in factories or similar buildings where under ordinary conditions the electric wires would be exposed to the action of acids and gases.

It relates particularly to that class of junction-box, conduit, and electric-wiring mechanisms and systems in which the wires are strung upon the outside of the building to be lighted and only such wires as are necessary to feed the lights therefrom extend into the building, the same being covered with gas-proof material, to the means for tapping the roof, so as to avoid causing a leak therein, to the means for sheltering and protecting electric wires at the point where they are joined together, to the means for sealing the sheltering junction-boxes, so as to prevent the admission of gases and water thereto and to the wires sheltered thereby, and to the means for connecting the junction-boxes and roof-tapping mechanisms systematically, so as to shelter the wires, protect them from the action of the acids and gases, and enable them to be strung and be readily repaired, removed, or replaced from the outside of such building, so as to enable the operator to perform the work, notwithstanding the stifling nature of the gases and fumes from the engines, &c., within the building.

It relates also to a system of junction-boxes and conduits arranged on the outside of the building, preferably upon the roof thereof, and provided with suitable mechanism for tapping the roof without causing leaks therein, suitable flexible protecting-tubes extending from the outside of the building to the lamps on the inside thereof, in combination with a suitable system of electric wiring arranged within such protecting mechanisms and mainly on the outside of the building, whereby a cut-out will only extinguish a small group of the lights and may be readily located and any of the parts repaired or removed, as desired, from the outside of the building.

The principal object of my invention is to provide a simple, economical, and efficient junction-box, conduit, and electric-wiring mechanism and system.

A further object of the invention is to provide a system of junction-boxes, conduit, and electric-wire-protecting tubes comprising a plurality of junction-boxes provided with means for tapping the roof of the building to be lighted, so as to prevent leakage and enable the necessary wires to be extended into the building from such junction-boxes, and the openings into the junction-boxes sealed, so as to protect such wires and enable the main part of the wiring to be done upon the outside of the building, such conduits, junctions, and protecting-tubes being adapted to efficiently protect the wire from the acids and fumes within the building and from the elements on the outside thereof, also to enable all necessary repairs to be made, cut-outs to be readily located, and old parts removed and replaced with new ones while the operator is on the outside of the building and not exposed to the fumes and gases on the inside thereof.

Other and further objects of the invention will appear from an inspection of the drawings and the following description and claims.

The invention consists in the features, combinations, and details of construction hereinafter described and claimed.

In the accompanying drawings, Figure 1 is a plan view of a building provided with my improved mechanism. Fig. 2 is a plan view of a portion of a building showing the arrangements of the junction-boxes, conduits, and protecting-tubes on the outside thereof. Fig. 3 is a sectional view in elevation, taken on line 3 of Fig. 2 looking in the direction of the arrow. Fig. 4 is a sectional view in elevation of one of the main junction-boxes constructed in accordance with my improvements. Fig. 5 is a sectional plan view thereof, taken on line 5 of Fig. 4. Fig. 6 is a sectional view in elevation of one of the intermediate junction-boxes. Fig. 7 is a sectional elevation of one of the outside boxes of each group, and Fig. 8 is a sectional plan view taken on line 8 of Fig. 6 looking downward.

In constructing a mechanism or system of the class described in accordance with my improvements I provide a series of main junction-boxes $a$, one or more series of intermediate junction-boxes $b$, and a series of junction-boxes $c$, each of such junction-boxes comprising an upper casing portion $d$, forming a chamber $e$ therein. Each of these casings is provided with an opening $f$, in the bottom thereof, and a standard $g$, extending downwardly therefrom, provided with an axial opening $h$ therein communicating with the opening in the bottom of the casing, and thereby with the chamber. The standards are each provided with a preferably annular inclined flange $i$, extending downwardly and outward laterally therefrom, and forming, in connection with the standard, a suitable base to support the junction-box in position. The junction-boxes thus formed are adapted to be mounted upon a roof $j$ and attached thereto by means of screws $k$, extending through perforations $l$ in such flange or base. The base of each of such junction-boxes is provided with a downwardly-extending tap $o$, each having an axial opening $p$ therethrough communicating with the axial opening of the standard, and thereby with the chamber of the casing, and a tube of circular loom $q$ or similar material is provided and mounted in the axial opening of the standard and tap, so as to extend therethrough into the chamber in the casing and adapted to contain suitable electric-lighting wires, which extend from the inner chamber of the fuse-box on the outside of the building to the lamps on the interior of the building. In order to prevent the gases and fumes in the interior of the building from penetrating into the chamber of the fuse-box, the opening in the standard and in the bottom of the fuse-box between the tube and the walls of such openings is sealed by means of compound $r$ or similar cement or sealing material packed in such opening while in a plastic condition and permitted to become hardened therein, so as to seal the opening and render it gas and air proof. A suitable cover $s$, having a downwardly-extending annular flange $t$, is provided for each of such junction-boxes and removably arranged thereon, so as to entirely close the chamber in the casing thereof. These covers are preferably attached to the junction-box by means of screws $u$, extending therethrough in threaded engagement with lugs $v$ on the walls or casing of the junction-box. By making the bottoms of the above-described standards or bases in the form of an inclined laterally-extending flange it will be seen that such bases are adapted to be mounted upon the roof of the house to be lighted with the flange intermediate the sheathing or main portion of the roof and the exterior layer of tarred felt paper, gravel roofing, or similar material, so as to prevent leakage. A second protecting-flange $w$ may also be provided above the base to extend over the edge of the exterior layer of the roof to further insure it against leakage.

Each of the fuse-boxes $a$ and $b$ is provided, preferably on opposite sides thereof, with openings $y$ for receiving the ends of suitable conduits 2 or protecting-tubes 3, or both, therein, or any desired wire-protecting tube or casing for protecting suitable electric wires properly insulated and mounted in such tubes, conduits, or casings, as hereinafter described.

In wiring an ordinary roundhouse I mount a plurality or series of the main junction-boxes, such as that shown in Figs. 4 and 5, at regular intervals on the outside of the house to be lighted and preferably upon the roof thereof, as shown in Figs. 2 and 3, the roof being perforated and the taps extended therethrough, as shown in the drawings. These main junction-boxes are preferably arranged, in case of a roundhouse, nearest the peak or highest portion of the roof and are connected by means of conduits 2, which are made preferably of hollow metallic tubing. A series of junction-boxes $d$, which for convenience may be termed "terminal" junction-boxes, are arranged, preferably, nearest the edge of the roof, and as many intermediate boxes $b$ as may be desired are mounted intermediate the main junction-boxes and terminal boxes, as shown in Figs. 2 and 3, all connected together by means of suitable hollow conduit-pipes suitable for sheltering the wires to be mounted therein. I prefer to use metallic tubing for connecting the main junction-boxes, or, in other words, for sheltering the mains and all wires on the outside of the building or extending from one junction-box to the other, and the flexible tubes of circular loom to contain and protect the branch wires leading from the wires on the outside to the lights on the inside of the building.

The main junction-boxes are each provided with an ordinary cut-out or fuse-box 4, having the ordinary connecting copper or brass clips and porcelain plugs, metallic shells, and fuses common and well known in the art and which need not be specifically described here. Each of such main junction-boxes is provided, as already stated, with openings $y$, preferably on the opposite sides thereof, for receiving the mains and also with an opening 5 on one side thereof, through which extend the wires leading from such junction and junction-box to the group of lights directly connected therewith.

I prefer to connect three lights with the main at each junction, and such junction being provided with the ordinary cut-out common and well known in the art it will be readily seen that by this arrangement a short circuit will only extinguish three lamps and may be readily located and repaired. I have here shown a three-wire system comprising feeders connected with a dynamo (not shown) or any suitable source of electric supply. These feeders comprise wire 6, which may be employed as the positive wire, wire 7, which may be employed as the negative, and wire 8, which may be employed as the neutral. They are connected with a main which comprises three wires 9, 10, and 11, wire 9 being the positive, 10 the neutral, and 11 the negative. These wires of the main may, in case of wiring a roundhouse, which is circular in form, each be continued until it forms a complete circle; but in cases where a building of other formation is being lighted they of course need only extend far enough to connect all the lights in the position in which such lights are placed, as shown in Fig. 5, and each group of these lights is preferably connected to the positive and neutral and to the negative and neutral wires of the main alternately, so as to balance the circuit, and in connection with the arrangement of the fuse-boxes or cut-outs herein described enable the location of a short circuit to be readily determined and the repairs readily made all from the outside of the building.

In the cut-out or fuse-box shown in Fig. 5 the positive wire 9 and the neutral wire 10 of the main are connected with positive wire 12 and the negative wire 13, which lead to one group of lamps—for instance, lamps 14, 15, and 16, as shown in Fig. 3, the lamp 15 being connected inside of the fuse-box $b$ to such wires 12 and 13 by means of positive wire 17 and negative wire 18, and the lamp 16 being mounted in direct connection with the wires 12 and 13, and all connected to the main, as above suggested, by means of copper clips 19 and 20, connected to the metallic shells of porcelain plugs 21 and 22, and clips 23 and 24, connected to the metallic centers of such plugs, such metallic centers and shells being connected by the ordinary fuse in the ordinary way. The negative wire 11 of the main, which is shown in Fig. 5 on the outside of the fuse-box as disconnected from the clips, should in the next junction be placed in the position occupied by the positive wire in Fig. 5, thus balancing the circuit, as already suggested. By this arrangement it will be readily understood by those skilled in the art that three or any desired number of lamps may be connected with the main on the inside of each junction-box.

This arrangement of junction-boxes and conduits on the outside of the building, preferably on the roof, each of such junction-boxes being provided with a hollow standard and tap portion extending downward therefrom through the roof of the building, enable repairs to be made by the operator from the outside of the building, no matter how dense the suffocating fumes and gases from the engines, &c., may be on the inside thereof. Suitable tubes of circular loom being mounted in the hollow standards and containing the wires connected with the lamps on the inside of the building and extending therefrom into the inner chamber of the junction-boxes, which are sealed so as to prevent the admission of gases and acid thereto, greatly increase the length of the life of the wires. In order to repair the wires extending downward from any fuse-box into the building, it is only necessary to remove the lamp and draw the wires up through the boxes, standard, and tap, removing the cement or compound and replacing new wires in their stead and seal the opening with new cement or compound.

I claim—

1. In mechanisms of the class described, the combination of a junction-box comprising an upper casing portion forming a chamber provided with an opening at the bottom thereof, a standard portion extending downward from such box portion provided with an axial opening communicating with the chamber of the upper casing portion, a flange on such standard forming therewith a base for supporting such junction-box on a roof and for forming a water-tight connection between such base and roof, and an integral tap extending downward from such base and provided with an axial opening therein communicating with the axial opening in the standard portion for tapping a roof, substantially as described.

2. In mechanisms of the class described, the combination of a junction-box comprising an upper casing portion forming a chamber and provided with an opening in the bottom of such upper casing portion, an integral standard extending downward therefrom provided with an axial opening communicating with the chamber of the upper casing portion, an integral flange on such standard portion extending outward laterally thereof forming therewith a base for supporting such junction-box on a roof and for forming a water-tight connection between such base and roof, and an integral tap portion extending downward from such base and provided with an axial opening therein communicating with the axial opening in the standard portion for tapping a roof, substantially as described.

3. In mechanisms of the class described, the combination of a junction-box comprising an upper casing portion forming a chamber and provided with an opening in the bottom of such box portion, a standard extending downward from such box portion provided with an axial opening communicating with the chamber thereof, a flange upon such standard extending outward laterally thereof and therewith forming a base for supporting the upper casing portion on a roof and for forming a water-tight connection between such base and roof, an integral tap extending downward from such base and provided with an axial opening therein communicating with the axial opening in the standard portion for tapping a roof, electric wires mounted outside of the roof and extending into the chamber of the upper casing portion, electric wires removably mounted in the standard portion extending into the chamber of the upper casing portion and downward therefrom on the inside of the tap through the roof, and means for sealing the opening in the bottom of the box portion and standard, substantially as described.

4. In mechanisms of the class described, the combination of a casing forming a chamber and provided with an opening in the bottom of such casing portion, a standard extending downward from such box portion provided with an axial opening communicating with the chamber thereof, a flange upon such standard extending outward laterally thereof forming therewith a base for supporting the upper casing portion and for forming a water-tight connection between such base and a roof, an integral tap extending downward from such base and provided with an axial opening communicating with the axial opening therein and thereby with the chamber of the upper casing portion for tapping a roof, a hollow tube extending through the tap and standard portions of such junction-box communicating with the chamber therein and removable upwardly through the chamber in the casing, electric wires mounted in such tube and removable therewith, and means for sealing the opening in the junction-box and standard between such tube and the walls of the passage in the standard, substantially as described.

5. In mechanisms of the class described, the combination of a junction-box comprising an upper casing forming a chamber, a standard extending downward from such casing provided with an axial opening communicating with such chamber, a flange upon such standard forming therewith a base for supporting the junction-box, and an integral tap extending downward from such base for tapping the roof of a building to be lighted and provided with an axial opening therein communicating with the opening in the standard and thereby with the chamber in the casing, a tube of circular loom adapted to contain suitable wires mounted in and extending through such tap and standard portions, means for sealing the opening between the tube and the walls of the standard, conduit-tube mechanism arranged above the roof of the building to be lighted and communicating with the chamber of the casing, negative and positive electric-lighting wires extending downward inside of such standard and tube of circular loom through the roof and removable upwardly through the junction-box, negative and positive electric-lighting wires mounted in such conduit-tube mechanism above the roof and extending into the chamber of the junction-box, and a fuse-box mounted in such junction-box and connected with both of such sets of wires, substantially as described.

6. In mechanisms of the class described, the combination of a plurality of covered junction-boxes mounted on the outside of a building to be lighted each comprising an upper casing portion forming a chamber, a standard for each casing extending downward therefrom each provided with an opening therein communicating with the chamber of the casing, a flange mounted upon each of such standards forming therewith a base, an integral tap extending downward from each base to the inside of the building to be lighted provided with an axial opening therein communicating with the opening in the standard and thereby with the chamber in the casing, a tube of circular loom or similar material mounted in the opening in the standard and tap and extending into the chamber of the casing, and means for sealing the opening in each standard between the walls thereof and the tube of circular loom, substantially as described.

7. In mechanisms of the class described, the combination of a plurality of covered junction-boxes mounted on the outside of a building to be lighted each comprising an upper casing portion forming a chamber, a standard for each casing extending downward therefrom each provided with an opening therein communicating with the chamber of the casing, a flange mounted upon each of such standards forming therewith a base, an integral tap extending downward from each base to the inside of the building to be lighted provided with an axial opening therein communicating with the opening in the standard and thereby with the chamber in the casing, a tube of circular loom or similar material mounted in the opening in the standard and tap and extending into the chamber of the casing, means for sealing the opening in each standard between the walls thereof and the tube of circular loom, and conduit-pipe mechanism connected with such junction-boxes and adapted to receive suitable electric-lighting wires, substantially as described.

8. In mechanisms of the class described, the combination of a plurality of covered junction-boxes mounted on the outside of a building to be lighted each comprising an upper casing portion forming a chamber, a standard for each casing extending downward therefrom each provided with an opening therein communicating with the chamber of the casing, a flange mounted upon each of such standards forming therewith a base, an integral tap extending downward from each base to the inside of the building to be lighted provided with an axial opening therein communicating with the opening in the standard and thereby with the chamber in the casing, a tube of circular loom or similar material mounted in the opening in the standard and tap and extending into the chamber of the casing, means for sealing the opening in each standard between the walls thereof and the tube of circular loom, conduit-pipe mechanism connected with such junction-boxes and adapted to receive suitable electric-lighting wires, and cut-out mechanism mounted in a series of such junction-boxes for connecting such wires, substantially as described.

9. In mechanisms of the class described, the combination of a plurality of covered junction-boxes mounted on the outside of a building to be lighted each comprising an upper casing portion forming a chamber, a standard for each casing extending downward therefrom each provided with an opening therein communicating with the chamber of the casing forming a base, an integral tap extending downward from each base to the inside of the building to be lighted provided with an axial opening therein communicating with the opening in the standard and thereby with the chamber in the casing, a flexible tube mounted in the opening in the standard and tap and extending from the chamber of the casing to the inside of the building, and means for sealing the opening in each standard between the walls thereof and such flexible tube, substantially as described.

10. In mechanisms of the class described, the combination of a plurality of covered junction-boxes mounted on the outside of a building to be lighted each comprising an upper casing portion forming a chamber, a standard for each casing extending downward therefrom each provided with an opening therein communicating with the chamber of the casing, a flange mounted upon each of such standards forming therewith a base, an integral tap extending downward from each base to the inside of the building to be lighted provided with an axial opening therein communicating with the opening in the standard and thereby with the chamber in the casing, a tube of circular loom or similar material mounted in the opening in the standard and tap and extending into the chamber of the casing, means for sealing the opening in each standard between the walls thereof and the tube of circular loom, a cut-out mounted in each of a series of such junction-boxes, a plurality of electric lamps arranged on the inside of the building to be lighted, and a plurality of electric wires connected with such lamps and with the cut-outs in the chambers of the desired junction-boxes on the outside of such building, substantially as described.

11. In mechanisms of the class described, the combination of a plurality of covered junction-boxes each comprising an upper casing forming a chamber and provided with an opening in the bottom portion thereof, a standard for each junction-box extending downward from the upper casing portion thereof provided with an axial opening and with a flange and forming therewith a base, an integral tap extending downward from such base provided with an axial opening therein communicating with the opening in the standard or base, a tube of circular loom or similar material mounted in the opening of the standard and tap portions of such boxes and extending into the chamber thereof, means for sealing the opening in the standard between the walls thereof and the tube, all mounted upon the roof of the building to be lighted with the taps extending therethrough and the base portions resting thereon, conduit-pipe mechanism communicating with such junction-boxes and adapted to contain suitable electric-lighting wires, and means for connecting such electric-lighting wires arranged inside of the desired junction-boxes, substantially as described.

FREDERICK J. RAVLIN.

Witnesses:
HARRY I. CROMER,
ANNA L. SAVOIE.